(12) United States Patent
Heikkilä

(10) Patent No.: US 6,356,750 B1
(45) Date of Patent: Mar. 12, 2002

(54) IDENTIFYING A TRAU FRAME IN A MOBILE TELEPHONE SYSTEM

(75) Inventor: Tapio Heikkilä, Oulu (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/254,099

(22) PCT Filed: Jul. 15, 1998

(86) PCT No.: PCT/FI98/00597

§ 371 Date: Apr. 19, 1999

§ 102(e) Date: Apr. 19, 1999

(87) PCT Pub. No.: WO99/05871

PCT Pub. Date: Feb. 4, 1999

(30) Foreign Application Priority Data

Jul. 22, 1997 (FI) ................................................ 973090

(51) Int. Cl.⁷ ............................................... H04M 11/00
(52) U.S. Cl. ..................... 455/403; 455/422; 455/423; 455/63; 455/67.3; 455/560
(58) Field of Search ............................... 455/422, 423, 455/414, 63, 67.3, 550, 560, 561; 370/328, 466, 465, 522, 509

(56) References Cited

U.S. PATENT DOCUMENTS

| 5,835,486 A | * 11/1998 | Davis et al. | 370/287 |
| 5,953,666 A | * 9/1999 | Lehtimaki | 455/439 |
| 5,991,716 A | * 11/1999 | Lehtimaki | 704/212 |
| 6,014,230 A | * 3/2000 | Sura | 455/422 |
| 6,035,179 A | * 3/2000 | Virtanen | 455/63 |
| 6,081,732 A | * 6/2000 | Suvanen et al. | 455/570 |
| 6,108,560 A | * 8/2000 | Navaro et al. | 455/517 |
| 6,138,020 A | * 10/2000 | Galyas et al. | 455/436 |

FOREIGN PATENT DOCUMENTS

| WO | WO 95/01072 | 1/1995 |
| WO | WO/96/32817 | 10/1996 |

OTHER PUBLICATIONS

Copy of the International Search Report for PCT/FI98/00597.

* cited by examiner

Primary Examiner—Daniel Hunter
Assistant Examiner—Yemane Woldetatios
(74) Attorney, Agent, or Firm—Altera Law Group, LLC

(57) ABSTRACT

The invention relates to identifying a TRAU frame in a mobile telephone system. A subscriber terminal normally transmits to a network part a speech frame to be placed in the TRAU frame, and when using discontinuous transmission, the subscriber terminal transmits to the network part a SID frame to be placed in the TRAU frame. A TRAU frame is currently identified in the network part on the basis of the sum of summed up SID code word bits as a speech frame, a SID frame or a SID frame corrupted on the radio path. In accordance with the invention, in addition to the SID code word bits, the other TRAU frame bits that normally contain speech, except for the SID parameter bits representing background noise, are summed up in the sum. Instead of the previously used 95 bits, 210 bits are used. The invention is preferably implemented by software changes in a channel codec.

24 Claims, 2 Drawing Sheets

|   | B |   |   |   |   |   |   |   |   |   |   |   |   |   |   |   |
|---|---|---|---|---|---|---|---|---|---|---|---|---|---|---|---|---|
| W | 15 | 14 | 13 | 12 | 11 | 10 | 9 | 8 | 7 | 6 | 5 | 4 | 3 | 2 | 1 | 0 |
| 0 | 0 | 0 | 0 | 0 | 0 | 0 | 0 | 0 | 0 | 0 | 0 | 0 | 0 | 0 | 0 | 0 |
| 1 | C15 | C14 | C13 | C12 | C11 | C10 | C9 | C8 | C7 | C6 | C5 | C4 | C3 | C2 | C1 | 1 |
| 2 | S | S | S | S | S | S | S | S | S | S | S | S | S | S | S | 1 |
| 3 | S | S | S | S | S | S | S | S | S | S | S | S | S | S | S | 1 |
| 4 | S | S | S | S | S | S | S | S | S | S | S | S | S | S | S | 1 |
| 5 | 0 | 0 | 0 | 0 | 0 | 0 | 0 | 0 | 0 | 0 | S | S | S | S | S | 1 |
| 6 | 0 | 0 | 0 | 0 | 0 | 0 | 0 | 0 | 0 | 0 | 0 | 0 | 0 | 0 | 0 | 1 |
| 7 | 0 | 0 | 0 | 0 | 0 | 0 | 0 | 0 | 0 | 0 | 0 | 0 | 0 | 0 | 0 | 1 |
| 8 | 0 | 0 | 0 | 0 | 0 | 0 | 0 | 0 | 0 | 0 | 0 | 0 | 0 | 0 | 0 | 1 |
| 9 | 0 | 0 | 0 | 0 | 0 | 0 | 0 | 0 | 0 | 0 | 0 | 0 | 0 | 0 | 0 | 1 |
| 10 | 0 | 0 | 0 | 0 | 0 | 0 | 0 | 0 | 0 | 0 | 0 | 0 | 0 | 0 | 0 | 1 |
| 11 | 0 | 0 | 0 | 0 | 0 | 0 | 0 | 0 | 0 | 0 | 0 | 0 | 0 | 0 | 0 | 1 |
| 12 | 0 | 0 | 0 | 0 | 0 | 0 | 0 | 0 | 0 | 0 | 0 | 0 | 0 | 0 | 0 | 1 |
| 13 | 0 | 0 | 0 | 0 | 0 | 0 | 0 | 0 | 0 | 0 | 0 | 0 | 0 | 0 | 0 | 1 |
| 14 | 0 | 0 | 0 | 0 | 0 | 0 | 0 | 0 | 0 | 0 | 0 | 0 | 0 | 0 | 0 | 1 |
| 15 | 0 | 0 | 0 | 0 | 0 | 0 | 0 | 0 | 0 | 0 | 0 | 0 | 0 | 0 | 0 | 1 |
| 16 | 0 | 0 | 0 | 0 | 0 | 0 | 0 | 0 | 0 | 0 | 0 | 0 | 0 | 0 | 0 | 1 |
| 17 | 0 | 0 | 0 | 0 | 0 | 0 | 0 | 0 | 0 | 0 | 0 | 0 | 0 | 0 | 0 | 1 |
| 18 | 0 | 0 | 0 | 0 | 0 | 0 | 0 | 0 | 0 | 0 | 0 | 0 | 0 | 0 | 0 | 1 |
| 19 | T4 | T3 | T2 | T1 | C21 | C20 | C19 | C18 | C17 | C16 | 0 | 0 | 0 | 0 | 0 | 1 |

Fig 2

IDENTIFYING A TRAU FRAME IN A MOBILE TELEPHONE SYSTEM

FIELD OF THE INVENTION

The invention relates to a method of identifying a TRAU frame in a mobile telephone system comprising a network part and at least one subscriber terminal having a radio connection to the network part, the subscriber terminal normally transmitting to the network part a speech frame to be placed in the TRAU frame, and when discontinuous transmission is used, the subscriber terminal transmits to the network part a SID frame to be placed in the TRAU frame, and on the basis of the sum of the bits in a SID code word, the TRAU frame is identified in the network part as a speech frame, a SID frame or a SID frame corrupted on the radio path.

BACKGROUND OF THE INVENTION

The problem in the above arrangement it that a SID frame that is transmitted by a subscriber terminal and corrupted on the radio path may be erroneously interpreted as a speech frame. This causes interference towards the listener of the telephone on the side of the fixed network in the form of an unpleasant kind of "clicking" sound.

The problem arises because said identification is badly designed in the GSM specifications and cannot cope well with SID frames that are corrupted on the radio path as a result of interference.

In accordance with the GSM specification, when changing over from normal transmission to discontinuous transmission, a SID frame is transmitted immediately after the last speech frame. If the SID frame is corrupted on the radio path, it is interpreted as a speech frame, and the interference is heard by the listener as a "click".

BRIEF DESCRIPTION OF THE INVENTION

It is the object of the invention to provide a method and an apparatus implementing the method for solving the above problems. This is achieved by a method of the type presented in the introduction, characterized by summing up, in addition to the SID code word bits, the other TRAU frame bits that normally contain speech, except for the SID parameter bits representing background noise.

The invention also relates to a mobile telephone system comprising a network part and at least one subscriber terminal having a radio connection to the network part, the subscriber terminal normally transmitting to the network part a speech frame to be placed in the TRAU frame, and when discontinuous transmission is used, the subscriber terminal transmits to the network part a SID frame to be placed in the TRAU frame, and on the basis of the sum of the bits in a SID code word the TRAU frame is identified in the network part as a speech frame, a SID frame or a SID frame corrupted on the radio path. The mobile telephone system of the invention is characterized in that a channel codec is arranged to sum up, in addition to the SID code word bits, the other TRAU frame bits that normally contain speech, except for the SID parameter bits representing background noise.

The preferred embodiments of the invention are disclosed in the dependent claims.

The invention is based on utilizing all the 260 bits transmitted and set to zero by a subscriber terminal. In addition to the SID code word bits, these include bits normally containing speech information, except for the SID parameter bits which represent background noise.

The method and system of the invention provide several advantages. The unpleasant interfering sounds are eliminated. No frame is unnecessarily rejected, resulting in improved speech quality for the listener.

BRIEF DESCRIPTION OF THE FIGURES

In the following the invention will be described in greater detail in connection with preferred embodiments with reference to the attached drawings, in which:

FIG. 2 shows the structure of a TRAU frame.

DETAILED DESCRIPTION OF THE INVENTION

Figure 1:
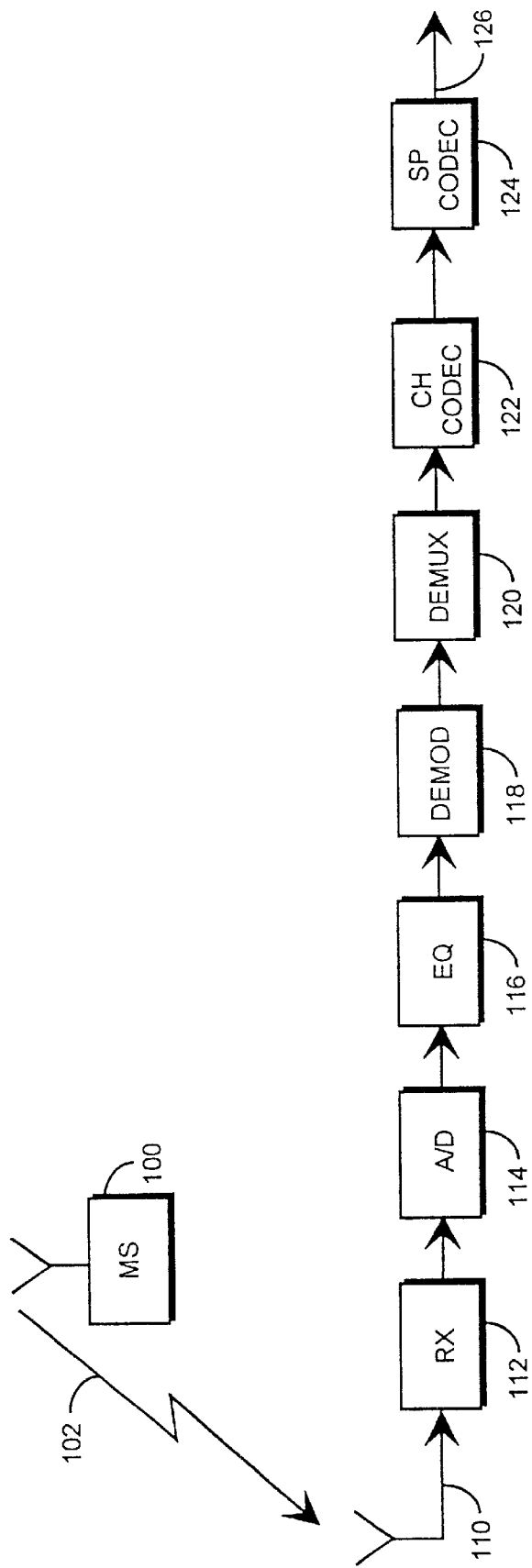
FIG. 1 shows the mobile telephone system of the invention.

The present invention can be used in the GSM system and in GSM-based systems, e.g. the DCS1800 system, in which the method of the invention can be used for identifying a TRAU frame.

FIG. 1 shows the parts of a mobile telephone system that are interesting from the point of view of the invention. A subscriber terminal 100 has, a radio connection 102 to a network part. A network part refers to a fixed part of a mobile telephone system, i.e. base stations, base station controllers, mobile switching centres, transmission systems and other parts of a mobile telephone system.

In the network part, the party of the radio connection 102 is a base station. In the following, the most important parts of a base station will be described. FIG. 1 only shows the blocks that are relevant to explaining the invention, but it is obvious to a person skilled in the art that a conventional base station also comprises other functions and structures which need not be described in more detail herein. The base station may be e.g. a base station of the type used in the GSM system, but, however, containing the changes required by the invention.

The base station typically comprises one or more transceivers. One transceiver provides radio capacity to one TDMA frame, i.e. typically to eight timeslots. FIG. 1 shows the reception side of the base station from the point of view of one receiver.

A frame received via an antenna 110 from the radio connection 102 is applied to a receiver 112 comprising a filter eliminating frequencies outside the desired frequency band. The signal is then converted into an intermediate frequency or directly into the base frequency, and in this form the signal is sampled and quantized in an analog/digital converter 114. An equalizer 116 compensates for interference, e.g. interference caused by multipath propagation. A demodulator 118 extracts from the equalized signal a bit stream which is transmitted to a demultiplexer 120. The demultiplexer 120 separates the bit stream from the different timeslots to its own logical channels.

A channel codec 122 decodes the bit stream of the different logical channels, i.e. decides whether the bit stream is signalling information to be transmitted to a signalling unit (not shown) or speech to be transmitted to a speech codec 124. The channel codec 122 also performs error correction. It is essential to the present invention that the identification of a TRAU frame is performed in the channel codec 122 in the manner shown in FIG. 2. The invention is preferably implemented by software, whereby only relatively simple software changes are needed within a strictly restricted area in the channel codec 122.

The speech codec 124 decodes received data, e.g. converts data containing speech from the form of a cellular radio network (e.g. 13 kbit/s) into the form 126 of a fixed network 64 kbit/s. The speech codec 124 is not necessarily located in the base station, but may also be located in the base station controller or in the vicinity of the mobile services switching centre. A person skilled in the art may use different terms for the speech codec 124, e.g. TC (Transcoder) or TRAU (Transcoder and Rate Adapter Unit).

FIG. 2 shows the structure of a TRAU frame. The 260 bits containing 20 ms of speech are coded in the subscriber terminal 100 by convolution coding the most important 50 class Ia bits and 132 class Ib bits. In addition, error correction bits are added, resulting in 378 bits. The less important 78 class II bits are added to these 378 bits. This results in a total of 456 bits, which in principle would fit into four radio bursts. However, for safety, the bits are spread into eight radio bursts in sub-blocks of 57 bits. Each burst is transmitted at an interval of 577 microseconds.

The transmitted speech bits are collected from eight successive burst in the channel codec 122. The convolution coding is decoded and the original 260 bits containing speech are placed in a TRAU frame.

If discontinuous transmission is employed, the subscriber terminal 100 transmits a SID frame immediately at the beginning of a pause and then one SID frame in eight successive bursts always at intervals of 480 milliseconds. When discontinuous transmission is employed, the battery of the mobile telephone can be made last longer, since the transmitter of the mobile telephone is continuously switched on only when the user is speaking.

As in handling speech, the transmitted bits are collected from eight successive burst in the channel codec 122. The convolution coding is decoded and the original 260 bits are placed in a TRAU frame.

The values of the bits 0–15 of a TRAU frame word 0 are always zero so that successive TRAU frames are distinguished from one another. The least significant 0 bit of every following word 1–19 is always a synchronization bit having the value 1.

The original 260 bits received from the air interface are placed in bits 1–15 of TRAU frame words 2–18 and in bits 1–5 of word 19.

Furthermore, the values of control bits C1–C21 in bits 1–15 of word 1 and bits 6–11 of word 19 are set in the channel codec 122. Timing bits T1–T4 located in bits 12–15 of word 19 are also set in the channel codec 122.

FIG. 2 shows the 320 bits of a TRAU frame at an instant when a SID frame transmitted by a subscriber terminal 100 employing discontinuous transmission has been collected from eight bursts to one TRAU frame in the channel codec.

The background sounds in the environment of the subscriber terminal are now depicted by SID parameter bits S located in bits 1–15 of words 2–4 and in bits 1–5 of word 5.

The 95 bits of the SID code word are set to zero in the subscriber terminal before transmission, and they are denoted in the figure by bold and italicized zeros, i.e. they are located in bits 10–11 and 13–14 of word 5, bits 1–2, 4–5, 7–8, 10–11, 13–14 of word 6, etc. A TRAU frame received in accordance with prior art is identified on the basis of these 95 bits of the SID code word. Due to corruption on the radio path, some bits may change from zero to one. When the sum of the 95 bits of the SID code word is below two, the SID frame is considered to be good. When the sum of the bits exceeds or is equal to two, but less than sixteen, the SID frame is corrupted. When the sum of the bits exceeds or is equal to sixteen, the frame is a speech frame. The actual problem is that a badly corrupted SID frame can be interpreted as a speech frame if the sum of the bits of the SID code word is equal to or exceeds sixteen.

The identification performed in the channel codec is signalled to the speech codec 124 by control bits C12 and C13–C14. Control bit C12 is a BFI flag (Bad Frame Identification) whose value is set to one when the received frame is corrupted. Control bits C13–C14 are SID bits which indicate if the received frame has been interpreted as a speech frame (the values of bits C13–C14 are set to zero), a SID frame (the values of bits C13–C14 are set to two), or a corrupted SID frame (the values of bits C13–C14 are set to one).

In accordance with the invention, the other TRAU frame bits that normally contain speech, except for the SID parameter bits representing background noise, are summed up in the sum of the summed up bits of the SID code word. This is advantageous since these bits are also set to zero in the subscriber terminal. FIG. 2 shows said bits by normal zeros, i.e. they are located in bits 6–9, 12 and 15 of word 5, in bits 3, 6, 9, 12 and 15 of word 6, etc.

Identification is performed in accordance with prior art by the 95 bits of the SID code word, but in accordance with the invention, identification is performed on the basis of 95+115=210 bits. This produces a significantly more reliable result, since momentary interference cannot excessively affect the reliability of the identification.

As prior art, the invention also uses a defined upper limit and lower limit. When the sum of the summed up bits exceeds a predetermined upper limit, the TRAU unit to be identified is a speech frame. When the sum of the summed up bits is below a predetermined upper limit, but exceeds a predetermined lower limit, the TRAU frame to be identified is a corrupted SID frame. When the sum of the summed up bits is below a predetermined lower limit, the TRAU frame to be identified is a SID frame.

However, the values of SID bits C13–C14 are set using limits according to prior art, not using the limits of the invention. A corrupted SID frame detected by using the limits according to the invention is indicated by setting the BFI bit C12 on. This provides the advantage that the procedure according to the GSM specification does not have to be changed. The following two examples clarify this.

If the sum of the 210 bits of a decoded frame is e.g. 44 and the sum of the 95 bits of the SID code word is 18, then the value of the SID bits C13–C14 in the TRAU frame is set to zero, i.e. said frame is a speech frame. The Applicant's studies show that such a speech frame containing so few ones (44/210) cannot exist, instead a corrupted SID frame transmitted by a subscriber terminal must be involved. Consequently, the value of the SID bits C13–C14 is set to zero in a known manner, i.e. a speech frame is involved, but the frame is rejected by setting the BFI bit C12 on.

If again the sum of the 210 bits of a decoded frame is e.g. 10, and the sum of the 95 bits of the SID code word is only one, then the value of the SID bits C13–C14 in the TRAU frame is set to two, i.e. said frame is a good SID frame. The Applicant's studies show that such a frame causes interference in the form of a kind of "helicopter" sound, and consequently the frame is rejected by setting the BFI bit C12 on.

According to the Applicant, when studying the speech coding of a GSM telephone, it can be observed than the sum of the 210 bits in the speech frame varies approximately within the range 80–120. In the tests the corresponding sum of the 210 bits in SID frames causing "clicks" is approximately within the range 25–60.

According to the Applicant's studies, the upper limit is consequently between 60 and 80, and the lower limit between 5 and 10. The upper limit is preferably about 65. The lower limit is preferably about 8.

In a preferred embodiment, in addition to the SID code word bits, the other TRAU frame class I bits that are protected with convolution coding and normally contain speech, except for the SID parameter bits representing background noise, are summed up in the sum. In another preferred embodiment, in addition to the SID code word bits, the other TRAU frame class II bits that are not convolution coded and normally contain speech, except for the SID parameter bits representing background noise, are summed up in the sum. In both these embodiments, the upper and lower limits to be used have to be defined by experiments.

Although the invention is described in the above with reference to the example in accordance with the accompanying drawings, it will be appreciated that the invention is not to be so limited, but may be modified in a variety of ways within the scope of the inventive idea disclosed in the appended claims.

What is claimed is:

1. A method of identifying a TRAU frame in a mobile telephone system comprising: a network part and at least one subscriber terminal having a radio connection to the network part; the subscriber terminal normally transmitting to the network part a speech frame to be placed in the TRAU frame; and when discontinuous transmission is used, the subscriber terminal transmits to the network part a SID frame to be placed in the TRAU frame; and on the basis of the sum of the bits in a SID code word the TRAU frame is identified in the network part as a speech frame, a SID frame or a SID frame corrupted on the radio path, wherein by summing up, in addition to the SID code word bits, the other TRAU frame bits that normally contain speech, except for the SID parameter bits representing background noise.

2. A method as claimed in claim 1, wherein the 95 bits of the SID code word are located in words 5–19 of the TRAU frame, and the 50 SID parameter bits representing background noise are located in words 2–5 of the TRAU frame, and the remaining 115 TRAU frame bits normally containing speech are located in words 2–19 of the TRAU frame.

3. A method as claimed in claim 1, wherein when discontinuous transmission is used, the SID code word bits and the other TRAU frame bits that normally contain speech, except for the SID parameter bits representing background noise, are set to zero in the subscriber terminal.

4. A method as claimed in claim 1, wherein when the sum of the summed up bits exceeds a predetermined upper limit, the TRAU frame to be identified is a speech frame.

5. A method as claimed in claim 1, wherein when the sum of the summed up bits is below a predetermined upper limit, but exceeds a predetermined lower limit, the TRAU frame to be identified is a corrupted SID frame.

6. A method as claimed in claim 1, wherein when the sum of the summed up bits is below a predetermined upper limit, the TRAU frame to be identified is a SID frame.

7. A method as claimed in claim 4, wherein the upper limit is between 60 and 80.

8. A method as claimed in claim 7, wherein the upper limit is preferably about 65.

9. A method as claimed in claim 4, wherein the lower limit is between 5 and 10.

10. A method as claimed in claim 9, wherein the lower limit is preferably about 8.

11. A method as claimed in claim 1, wherein, in addition to the SID code word bits, the other TRAU frame class I bits that are protected with convolution coding and normally contain speech, except for the SID parameter bits representing background noise, are summed up in the sum.

12. A method as claimed in claim 1, wherein, in addition to the SID code word bits, the other TRAU frame class II bits that are not convolution coded and normally contain speech, except for the SID parameter bits representing background noise, are summed up in the sum.

13. A mobile telephone system comprising a network part and at least one subscriber terminal having a radio connection to the network part, the subscriber terminal normally transmitting to the network part a speech frame to be placed in the TRAU frame, and when discontinuous transmission is used, the subscriber terminal transmits to the network part a SID frame to be placed in the TRAU frame, and on the basis of the sum of the bits in a SID code word the TRAU frame is identified in the network part as a speech frame, a SID frame or a SID frame corrupted on the radio path, wherein that a channel codec is arranged to sum up, in addition to the SID code word bits, the other TRAU frame bits that normally contain speech, except for the SID parameter bits representing background noise.

14. A mobile telephone system as claimed in claim 13, wherein the 95 bits of the SID code word are located in words 5–19 of the TRAU frame, and the 50 SID parameter bits representing background noise are located in words 2–5 of the TRAU frame, and the remaining 115 TRAU frame bits normally containing speech are located in words 2–19 of the TRAU frame.

15. A mobile telephone system as claimed in claim 13, wherein when discontinuous transmission is used, the SID code word bits and the other TRAU frame bits that normally contain speech, except for the SID parameter bits representing background noise, are set to zero.

16. A mobile telephone system as claimed in claim 13, wherein the channel codec is so arranged that when the sum of the summed up bits exceeds a predetermined upper limit, the TRAU frame to be identified is a speech frame.

17. A mobile telephone system as claimed in claim 13, wherein the channel codec is so arranged that when the sum of the summed up bits is below a predetermined upper limit, but exceeds a predetermined lower limit, the TRAU frame to be identified is a corrupted SID frame.

18. A mobile telephone system as claimed in claim 13, wherein the channel codec is so arranged that when the sum of the summed up bits is below a predetermined lower limit, the TRAU frame to be identified is a SID frame.

19. A mobile telephone system as claimed in claim 16, wherein the upper limit is between 60 and 80.

20. A mobile telephone system as claimed in claim 19, wherein the lower limit is preferably about 65.

21. A mobile telephone system as claimed in a claim 16, wherein the lower limit is between 5 and 10.

22. A mobile telephone system as claimed in claim 21, wherein the lower limit is preferably about 8.

23. A mobile telephone system as claimed in claim 13, wherein the channel codec is arranged to sum up in the sum, in addition to the SID code word bits, the other TRAU frame class I bits that are protected with convolution coding and normally contain speech, except for the SID parameter bits representing background noise.

24. A mobile telephone system as claimed in claim 13, wherein the channel codec is arranged to sum up in the sum, in addition to the SID code word bits, the other TRAU frame class II bits that are not convolution coded and normally contain speech, except for the SID parameter bits representing background noise.

* * * * *